United States Patent
Jonsson et al.

(10) Patent No.: US 10,181,726 B2
(45) Date of Patent: Jan. 15, 2019

(54) POWER TRANSFER BETWEEN PHASES IN A TRANSFORMER

(71) Applicant: ABB SCHWEIZ AG, Baden (CH)

(72) Inventors: Lars Jonsson, Västerås (SE); Nan Chen, Västerås (SE); Stefan Thorburn, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/555,884

(22) PCT Filed: Mar. 6, 2015

(86) PCT No.: PCT/EP2015/054694
§ 371 (c)(1),
(2) Date: Sep. 5, 2017

(87) PCT Pub. No.: WO2016/141949
PCT Pub. Date: Sep. 15, 2016

(65) Prior Publication Data
US 2018/0054060 A1   Feb. 22, 2018

(51) Int. Cl.
*H02J 3/26* (2006.01)
*H02J 3/12* (2006.01)
*H02J 3/18* (2006.01)

(52) U.S. Cl.
CPC . *H02J 3/26* (2013.01); *H02J 3/12* (2013.01); *H02J 3/1878* (2013.01); *Y02E 40/30* (2013.01); *Y02E 40/50* (2013.01)

(58) Field of Classification Search
CPC ... H02J 3/26; H02J 3/12; H02J 3/1878; Y02E 40/30; Y02E 40/50

USPC .......................................................... 307/14
See application file for complete search history.

(56) References Cited

U.S. PATENT DOCUMENTS

| 6,351,106 B1 | 2/2002 | Kramer et al. |
| 6,841,976 B1 * | 1/2005 | Sen ........................ G05F 1/70 323/209 |
| 2010/0125373 A1 | 5/2010 | Labuschagne et al. |

FOREIGN PATENT DOCUMENTS

| CN | 202178574 U | 3/2012 |
| CN | 202888851 U | 4/2013 |
| CN | 203039373 U | 7/2013 |
| JP | 2014-57481 A | 3/2014 |
| JP | 2014-57482 A | 3/2014 |

OTHER PUBLICATIONS

International Preliminary Report on Patentability, issued in PCT/EP2015/054694, dated Feb. 22, 2017.
International Search Report, issued in PCT/EP2015/054694, dated Nov. 3, 2015.

(Continued)

*Primary Examiner* — Carlos Amaya
(74) *Attorney, Agent, or Firm* — Birch, Stewart, Kolasch & Birch, LLP

(57) ABSTRACT

An AC power transformer includes primary and secondary windings for at least a first AC phase and a second AC phase, and a core for said at least first and second phases. The transformer further includes a control unit for transferring power from the first phase to the second phase via magnetic coupling in the core such that the sum of the phase vectors of all of the at least first and second phases is substantially zero.

19 Claims, 2 Drawing Sheets

(56) References Cited

OTHER PUBLICATIONS

Kasztenny et al., "Fundamentals of Short-Circuit Protection for Transformers", Previously presented at the 2010 Texas A&M Conference for Protective Relay Engineers, IEEE, 2012, 13 pages.

Luo et al., "Railway Static Power Conditioners for High-speed Train Traction Power Supply Systems Using Three-phase V/V Transformers", IEEE Transactions on Power Electronics, Oct. 2011, vol. 26, No. 10, pp. 2844-2856.

Wei et al., "A Novel Control Strategy for Optimization of Power Capacity Based on Railway Power Static Conditioner", IEEE, 2008, pp. 1669-1674.

Written Opinion of the International Searching Authority, issued in PCT/EP2015/054694, dated Nov. 3, 2015.

\* cited by examiner

POWER TRANSFER BETWEEN PHASES IN A TRANSFORMER

TECHNICAL FIELD

The present disclosure relates to an alternating current (AC) power transformer comprising primary and secondary windings for at least a first AC phase and a second AC phase, and a core for said at least first and second phases.

BACKGROUND

Phase unbalance in a three-phase alternating current (AC) power system is handled today by means of a converter, for instance a static VAr compensator (SVC) or a static synchronous compensator (STATCOM). However with a lot of negative sequence currents and need for voltage regulation the rating of the converter components either has to be raised or a prioritization between negative sequence compensation and voltage control has to be made for the converter.

SUMMARY

It is an objective of the present invention to provide an improved solution for controlling phase unbalances, especially negative sequence currents.

According to an aspect of the present invention, there is provided an AC power transformer comprising primary and secondary windings for at least a first AC phase and a second AC phase, and a core for said at least first and second phases. The transformer further comprises a control unit for transferring power from the first phase to the second phase via magnetic coupling (of magnetic flux) in the core such that the sum of the phase vectors of all of the at least first and second phases is substantially zero. The invention thus provides a new means for controlling the phase currents of a transformer.

According to another aspect of the present invention, there is provided an arrangement comprising an embodiment of the transformer of the present disclosure, and a power converter connected in series with the transformer, e.g. on the secondary side of the transformer, for controlling the at least first and second phases.

According to another aspect of the present invention, there is provided a method of controlling an AC power transformer comprising primary and secondary windings for at least a first AC phase and a second AC phase, and a core for said at least first and second phases. The method comprises transferring power from the first phase to the second phase via magnetic coupling in the core such that the sum of the phase vectors of all of the at least first and second phases is substantially zero.

According to another aspect of the present invention, there is provided a computer program product comprising computer-executable components for causing a control unit for a power transformer to perform an embodiment of the method of the present disclosure when the computer-executable components are run on processor circuitry comprised in the control unit.

According to another aspect of the present invention, there is provided a computer program for controlling an AC power transformer comprising primary and secondary windings for at least a first AC phase and a second phase, and a core for said at least first and second phases. The computer program comprises computer program code which is able to, when run on processor circuitry of a control unit for a phase leg of the power converter, cause the transformer to transfer power from the first phase to the second phase via magnetic coupling in the core such that the sum of the phase vectors of all of the at least first and second phases is substantially zero.

According to another aspect of the present invention, there is provided a computer program product comprising an embodiment of the computer program of the present disclosure and a computer readable means on which the computer program is stored.

By means of embodiments of the present invention, the controlling may be divided into negative sequence compensation within the transformer and positive sequence voltage control in an external converter, e.g. SVC or STATCOM, (if at all needed). In some embodiments, the power transformer may be placed in series with a transmission line to compensate for unbalances caused by non-perfect or non-ideal phase transposings of the transmission line.

Power may be transformed between the different phases of the system via the magnetic core of the transformer (connected to the SVC) by introducing a controlled phase shift in at least two of the (e.g. three) phases. The phase shift is made +/−delta degrees leading to a constant flux in the core. Seen from one side (primary or secondary side) of the transformer it is now an unbalanced device, and on the other side of the transformer it is possible to attach a symmetrical device such as a STATCOM/SVC.

In addition to the phase shifting (adjustment of the phase angles), it may also be possible to adjust the magnitude of the voltage ratio (length of the phase angle(s)) in at least one of the phases in order to achieve the substantially zero sum of the phase vectors.

It is noted that there are several possible combinations of tap changers which may be used for introducing phase shifting and turn ratio shifting in the phases.

Note also that the principle may work also for a non power electronics (PE) based transformers where use can be made of phase-individual tap changings. It may to some extent work also with utilizing turn only variations in the individual tap changers.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
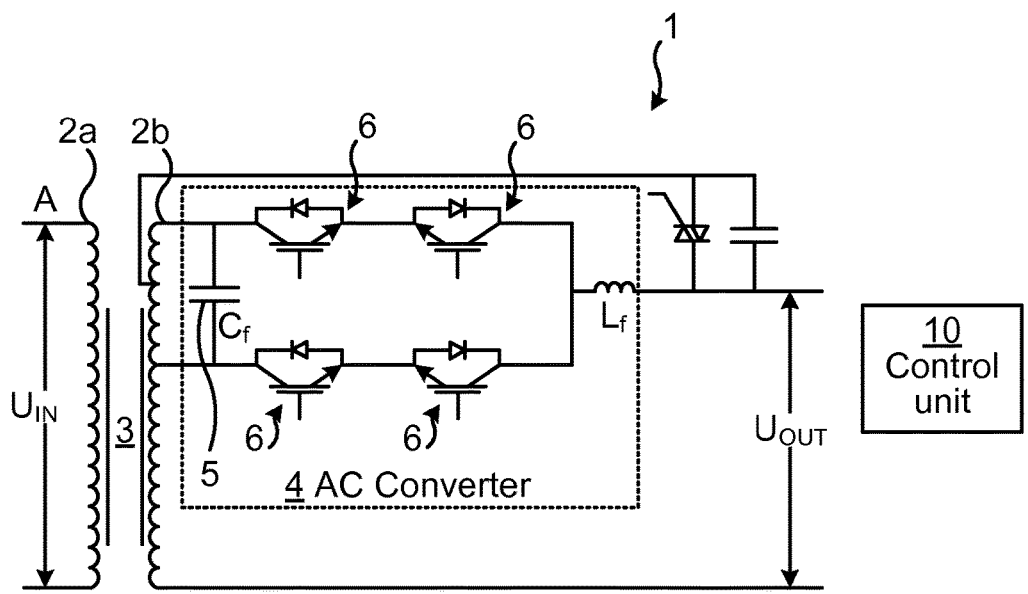
FIG. 1 is a schematic circuit diagram of an embodiment of an AC power transformer in accordance with the present invention.

FIG. 1 is an illustration of one phase of a power transformer 1. The transformer 1 has a primary winding 2a connected to an input voltage $U_{IN}$ of the transformer, and a secondary winding 2b providing an output voltage $U_{UOT}$ of the transformer 1, and a core 3. In accordance with the present invention, the core 3 is also connected to the cores of the other phases of the transformer such that magnetic flux, and thus electrical power, may be exchanged between the different phases in the transformer via the core 3. The core 3 may e.g. be a conventional three or five legged core for a three-phase transformer 1. A single-phase core 3 can not be used, since the core should be able to transfer power between the phases. The primary and/or the secondary winding may be provided with taps (in the figure the secondary winding 2b), allowing tap-changer(s) or power electronics (PE) to be connected over a set or variable part of the secondary winding 2a or 2b. In the embodiment of FIG. 1, the tap-changing function is performed by means of PE connected to the secondary winding 2b, in the form of a thin AC converter 4, without having to mechanically change between taps of the secondary winding 2b. However, in other embodiments, the AC converter 4 may be connected to the primary winding 2a. The converter 4 comprises at least one, typically a plurality of, switch(es) 6, e.g. each comprising a thyristor or transistor such as an insulated-gate bipolar transistor (IGBT) and a diode. The converter 4 also comprises at least one capacitor 5, having a capacitance $C_f$, for intermediate storing of electrical power, enabling the converter 4 to alter the phase angle of the phase. The converter 4 may also comprise a reactor having an inductance $L_f$. In general, conventional circuit diagram symbols representing components are used in the figures of the present patent application. By means of the converter 4, which may be regarded as a solid-state tap changer, the amplitude and/or the angle of the phasor of the phase may be modified as desired in accordance with the present invention, e.g. for negative sequence compensation. Generally, the AC converter 4 may comprise any type of PE converter, such as a matrix converter, back or boost converter, modular multi-level converter (MMC) etc. which is able to change phase and/or amplitude of the phases.

The use of the converter 4 may induce some losses, but this may be weighed against lower cost for the main converter (if at all needed), connected in series with the transformer 1, which may have a lower rating and thus cheaper components. By means of embodiments of the present invention an independent control of the three phases in the transformer is enabled, as long as the sum of the three phase vectors are (substantially or close to) zero. This may reduce the risk of a "DC flux" in the core 3, saturating the core. It may then be possible to transform power between the phases via the magnetic flux in the core 3. The arrangement may be especially efficient for negative sequence currents, implying that this transformer 1 may fit very well together with an static VAr compensator (SVC) which can then focus on controlling the positive sequence voltage. However, in some embodiments, the AC converters 4 of the phases are sufficient to control the phases (both the negative sequence current and the voltage), in which embodiments no additional external power converter (e.g. SVC or STATCOM) is used.

The transformer 1 also comprises a control unit 10 (arranged locally or at a central control station) for controlling the transformer, specially for controlling the switches 6 of the AC converter 4 of the transformer. By means of the control unit 10 controlling the AC converter 4 (or other tap changing means) a transfer of power is induced from the primary side (primary winding 2a) of the first phase of the transformer 1 to a primary side of another phase of the transformer 1 via the magnetic coupling between the phases as provided by the core 3. The control unit 10 may e.g. receive information from sensors within the transformer 1 or from remote locations.

By choosing the winding type of the transformer 1 and the grounding philosophy it may be possible to influence also the zero sequence characteristics of the circuit.

Figure 2:
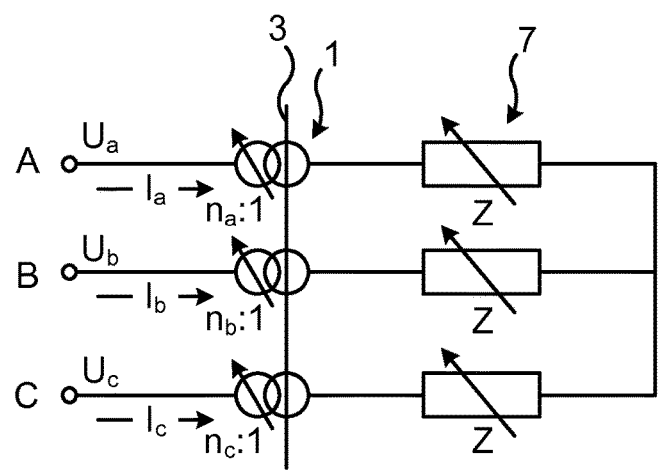
FIG. 2 is a schematic circuit diagram of an embodiment of a transformer connected in series with a power converter, in accordance with the present invention.

FIG. 2 illustrates an embodiment with a three-phase transformer 1, with phases e.g. as discussed in relation to FIG. 1, connected in series with a three phase main power converter 7 (having an impedance Z). However, it may be more convenient to connect the respective tap changing functionality, e.g. in the form of an AC converter 4 of PE, to the primary side (winding) 2a of each of the phases A, B and C such that the transformer core 3 is functionally positioned between the AC converters 4 and the main (external) power converter 7. The converter 7 may be a static VAr compensator (SVC) or a static synchronous compensator (STATCOM). In some embodiments, the converter 7 may be replaced with a fixed impedance. The core 3 is shown to illustrated that it is a core which is common to all the three phases A, B and C. The transformer embodiment of FIG. 2 has a Y (wye or star) configuration on both the primary and the secondary side, i.e. each phase leg is connected between phase and ground, for this reason called a Ynyn transformer. However, other topologies are also contemplated, e.g. a delta configuration (i.e. each phase leg is connected between two phases) on the secondary side of the transformer 1. In accordance with the present invention, $n_a$, $n_b$ and $n_c$ (which are complex numbers) are not all the same, i.e. the transformation of the three phases is unsymmetrical.

In some embodiments of the present invention, the transferring of power between the phases comprises changing the amplitude and/or the phase angle of the phase vectors of both the first phase A and the second phase B.

In some embodiments of the present invention, the at least first and second phases A and B also comprises a third phase C, whereby the transformer 1 is configured for a three-phase system. The phase angles may then be changed such that the angle between the phase vectors of the first and second phases A and B is intentionally not 120 degrees (which would be the normal symmetry in a three-phase system).

In some embodiments of the present invention, the control unit 10 is configured for controlling power electronics connected to the first and second phases A and B for said transferring of power between the phases, e.g. respective power electronics connected in series with each of the at least first and second phases A, B and/or C, e.g. as shown in FIG. 1. In some embodiments, said power electronics comprises a first AC converter 4 connected to the primary winding of the first phase A and a second AC converter 4 connected to the primary winding of the second phase B. The first and second AC converters 4 are typically not connected to each other, but only to its respective phase (the connection between the phases being via the core 3). In some embodiments, each of the first and second AC converters 4 comprises at least one semiconductor, or alternatively mechanical, switch 6 and/or an energy storing component such as a capacitor or inductor 5, for being able the shift the phase. An alternative to the solid-state PE tap changer is to use more traditional mechanical tap-changers for introducing the phase shift. Mechanical tap-changers may also be used in addition to PE. Thus, additionally or alternatively, in some embodiments, the control unit 10 is configured for controlling mechanical tap changers on the windings 2 of the first and second phases A and B for said transferring of power between the phases.

If the transformer 1 is used together with an external power converter 7 (connected in series with the transformer 1, typically on the secondary side of the converter), the transformer 1, by means of the transferring power, may be configured for primarily controlling negative sequence currents of the phases A, B and C, while the power converter 7 is configured for primarily controlling positive sequence voltages of said phases. Thus, the rating, and thus cost, of the semiconductor parts of the power converter 7 may be reduced.

The transformer 1 may be caused to perform an embodiment of the method of the present disclosure, by means of the control unit 10 running a computer program, as presented above. This computer program may be stored in the data storage unit of the control unit 10, or be stored on an external medium, to form a computer program product. The computer program product comprises a computer readable (non-volatile) medium comprising a computer program in the form of computer-executable components. The computer program/computer-executable components may be configured to cause a transformer 1 comprising the control unit 10, e.g. as discussed herein, to perform an embodiment of the method of the present disclosure. The computer program/computer-executable components may be run on the processor circuitry of the control unit 10 for causing it (or other parts of the transformer) to perform the method. The computer program product may e.g. be comprised in a storage unit or memory comprised in the control unit and associated with the processor circuitry. Alternatively, the computer program product may be, or be part of, a separate, e.g. mobile, storage means, such as a computer readable disc, e.g. CD or DVD or hard disc/drive, or a solid state storage medium, e.g. a RAM or Flash memory.

EXAMPLE

A Ynyn transformer 1 is used in series with an SVC 7, as illustrated in FIG. 2. The converter impedance and transformer impedance are combined $$Z = Z_s + Z_k$$

where s and k are the two impedances which will occur in the circuit.

It is also possible to write the tap ratio as $$n_i = n_i e^{j\varphi_i} \; i \in [a,b,c]$$

where a, b and c are the different phases (herein also called A, B and C), j is the square root of −1, and φ is the angle which is shifted.

This gives $$\begin{bmatrix} U_a \\ U_b \\ U_c \end{bmatrix} = \begin{bmatrix} n_a e^{j\varphi_a} Z & 0 & 0 \\ 0 & n_b e^{j\varphi_b} Z & 0 \\ 0 & 0 & n_c e^{j\varphi_c} Z \end{bmatrix} \begin{bmatrix} I_a \\ I_b \\ I_c \end{bmatrix}$$

where U is the output voltage, and I is the output current, of the combined transformer-converter of respective phase.

The symmetrical components of these voltages can be derived by introducing $a = 1e^{120°}$ and $$A = \begin{bmatrix} 1 & 1 & 1 \\ 1 & a^2 & a \\ 1 & a & a^2 \end{bmatrix}$$

in accordance with conventional theory around symmetrical components (see e.g. the textbook Power System Analysis by John J. Grainger and William D. Stevenson, JR, McGraw-Hill International Editions—Electrical Engineering Series, especially chapters 2 and 11-12, as well as figure 2.22 (relating to conventional symmetrical solutions with tap-changer). The symmetrical components can then be calculated (see e.g. section 11.5 in the above referenced textbook).

This results in $$3U_a^0 = I_a^0 (n_a e^{j\varphi_a} Z + n_b e^{j\varphi_b} Z + n_c e^{j\varphi_c} Z) + I_a^1 (n_a e^{j\varphi_a} Z + a^2 \cdot n_b e^{j\varphi_b} Z + a \cdot n_c e^{j\varphi_c} Z) + I_a^2 (n_a e^{j\varphi_a} Z + a \cdot n_b e^{j\varphi_b} Z + a^2 \cdot n_c e^{j\varphi_c} Z)$$

$$3U_a^1 = I_a^0 (n_a e^{j\varphi_a} Z + a \cdot n_b e^{j\varphi_b} Z + a^2 \cdot n_c e^{j\varphi_c} Z) + I_a^1 (n_a e^{j\varphi_a} Z + n_b e^{j\varphi_b} Z + n_c e^{j\varphi_c} Z) + I_a^2 (n_a e^{j\varphi_a} Z + a^2 \cdot n_b e^{j\varphi_b} Z + a \cdot n_c e^{j\varphi_c} Z)$$

$$3U_a^2 = I_a^0 (n_a e^{j\varphi_a} Z + a^2 \cdot n_b e^{j\varphi_b} Z + a \cdot n_c e^{j\varphi_c} Z) + I_a^1 (n_a e^{j\varphi_a} Z + a \cdot n_b e^{j\varphi_b} Z + a^2 \cdot n_c e^{j\varphi_c} Z) + I_a^2 (n_a e^{j\varphi_a} Z + n_b e^{j\varphi_b} Z + n_c e^{j\varphi_c} Z)$$

Thus, by having an independent phase shifting in each phase it is possible to transfer power between the sequence impedances. For example, if the turn ratio is set to 1 and the phase shift to 0, this results in the following:

$$3U_a^0 = I_a^0 (Z + e^{-j\varphi} Z + e^{j\varphi} Z) + I_a^1 (Z + e^{-j\varphi} a^2 Z + e^{j\varphi} a Z) + I_a^2 (Z + e^{-j\varphi} a Z + e^{j\varphi} a^2 Z)$$

$$3U_a^1 = I_a^0 (Z + a \cdot e^{-j\varphi} Z + a^2 \cdot e^{j\varphi} Z) + I_a^1 (Z + e^{-j\varphi} Z + e^{j\varphi} Z) + I_a^2 (Z + a^2 \cdot e^{-j\varphi} Z + a \cdot e^{j\varphi} Z)$$

$$3U_a^2 = I_a^0 (Z + a^2 \cdot e^{-j\varphi} Z + a \cdot e^{j\varphi} Z) + I_a^1 (Z + a \cdot e^{-j\varphi} Z + a^2 \cdot e^{j\varphi} Z) + I_a^2 (Z + e^{-j\varphi} Z + e^{j\varphi} Z)$$

If the zero sequence current is set to zero (no grounding) a simplified system is obtained $$3U_a^1 = I_a^1 Z(1 + 2\cos(\varphi)) + I_a^2 Z(1 + a^2 \cdot e^{-j\varphi} + a \cdot e^{j\varphi})$$

$$3U_a^2 = I_a^1 Z(1 + a \cdot e^{-j\varphi} + a^2 \cdot e^{j\varphi}) + I_a^2 Z(1 + 2\cos(\varphi))$$

Figure 3A:
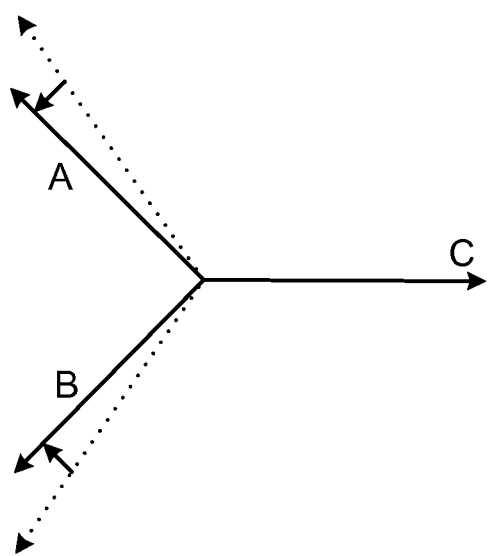
FIG. 3a is a schematic phasor diagram illustrating an embodiment of how two phases may be shifted in accordance with the present invention.
Figure 3B:
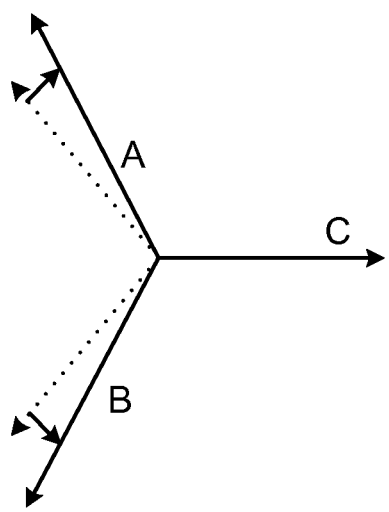
FIG. 3b is a schematic phasor diagram illustrating another embodiment of how two phases may be shifted in accordance with the present invention.

Trivially, if φ=0, the normal phasor relations are obtained. If φ≠0, the non-diagonal elements differ and two equations and two control variables (Z is controllable in the SVC-part) are obtained. Graphically, the phase shifts are as shown in FIGS. 3a (for the positive sequence grid) and 3b (for the negative sequence grid), where the ideal cases with 120° angles between all the phases are indicated with dotted arrows and small arrows indicate how the two phases A and B have been shifted. As is shown in the FIGS. 3a and 3b, although the phase angles of both phases A and B have been altered, while that of phase C is unaltered, they are altered in relation to each other (symmetrically), and the amplitudes (phasor lengths) are also adjusted, such that the sum of the phase vectors are still essentially zero.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. An AC power transformer for a three-phase system, the transformer comprising:
   primary and secondary windings for a first AC phase, a second AC phase and a third AC phase;
   a core for said at least first and second phases; and
   a control unit configured for controlling mechanical and/or solid-state tap changing means of the first and second phases for transferring power from the first phase to the second phase via magnetic coupling in the core by changing the amplitude and the phase angle of the phase vectors of both the first phase and the second phase,
   wherein the phase angles are changed such that the angle between the phase vectors of the first and second phases is not 120 degrees, such that the sum of the phase vectors of all of the first, second and third phases is substantially zero.

2. The transformer of claim 1, wherein the control unit is configured for controlling power electronics connected to the first and second phases for said transferring power, said respective power electronics connected in series with each of the at least first and second phases.

3. The transformer of claim 2, wherein said power electronics comprises a first AC converter connected to the primary winding of the first phase and a second AC converter connected to the primary winding of the second phase.

4. The transformer of claim 3, wherein each of the first and second AC converters comprises an inductor or a capacitor.

5. An arrangement comprising:
   the transformer of claim 2; and
   a power converter connected in series with the transformer, on the secondary side of the transformer, for controlling the at least first and second phases.

6. The transformer of claim 2, wherein the control unit is configured for controlling mechanical tap changers on the windings of the first and second phases for said transferring power.

7. An arrangement comprising:
   the transformer of claim 3; and
   a power converter connected in series with the transformer, on the secondary side of the transformer, for controlling the at least first and second phases.

8. The transformer of claim 3, wherein the control unit is configured for controlling mechanical tap changers on the windings of the first and second phases for said transferring power.

9. An arrangement comprising:
   the transformer of claim 4; and
   a power converter connected in series with the transformer, on the secondary side of the transformer, for controlling the at least first and second phases.

10. The transformer of claim 4, wherein the control unit is configured for controlling mechanical tap changers on the windings of the first and second phases for said transferring power.

11. The transformer of claim 1, wherein the control unit is configured for controlling mechanical tap changers on the windings of the first and second phases for said transferring power.

12. An arrangement comprising:
    the transformer of claim 11; and
    a power converter connected in series with the transformer, on the secondary side of the transformer, for controlling the at least first and second phases.

13. An arrangement comprising:
    the transformer of claim 1; and
    a power converter connected in series with the transformer, on the secondary side of the transformer, for controlling the at least first and second phases.

14. The arrangement of claim 13, wherein the transformer, by means of the transferring power, is configured for primarily controlling negative sequence currents of the phases, while the power converter is configured for primarily controlling positive sequence voltages of the phases.

15. A method of controlling a three-phase AC power transformer comprising primary and secondary windings for a first AC phase, a second AC phase and a third AC phase, and a core for said at least first and second phases, the method comprising:
    transferring power from the first phase to the second phase via a magnetic coupling in the core by changing the amplitude and the phase angle of the phase vectors of both the first phase and the second phase,
    wherein the phase angles are changed such that the angle between the phase vectors of the first and second phases is not 120 degrees, such that the sum of the phase vectors of all of the at least first and second phases is substantially zero.

16. The method of claim 15 performed by a control unit of the transformer by controlling mechanical and/or solid-state tap changing means of the first and second phases.

17. A computer program product comprising a non-transitory computer-readable storage medium having computer-executable components stored therein, the computer-executable components being configured to, when executed by processor circuitry comprised in the control unit for the transformer, cause the control unit for the power transformer to perform the method of claim 16.

18. A computer program product comprising a non-transitory computer-readable storage medium having computer-executable components stored therein, the computer-executable components being configured to, when executed by processor circuitry comprised in a control unit for the power transformer, cause the control unit for the power transformer to perform the method of claim 15.

19. A non-transitory computer readable medium storing computer program codes configured to control a three-phase AC power transformer comprising primary and secondary windings for a first AC phase, a second AC phase and a third AC phase, and a core for said at least first and second phases, the computer program comprising computer program code which is able to, when run on processor circuitry of a control unit for a phase leg of the power converter, cause the transformer to transfer power from the first phase to the second phase via a magnetic coupling in the core by changing the amplitude and the phase angle of the phase vectors of both the first phase and the second phase, wherein the phase angles are changed such that the angle between the phase vectors of the first and second phases is not 120 degrees, such that the sum of the phase vectors of all of the at least first and second phases is substantially zero.

* * * * *